US012326746B1

(12) United States Patent
Bostwick et al.

(10) Patent No.: US 12,326,746 B1
(45) Date of Patent: Jun. 10, 2025

(54) NORMALLY-OPEN VALVE ASSEMBLY WITH VARIABLE SPEED FLUID DISPLACEMENT

(71) Applicant: Flight Works, Inc., Irvine, CA (US)

(72) Inventors: Christopher Bostwick, Long Beach, CA (US); Sudathsi Tennakoon, Corona, CA (US); Eric Besnard, Long Beach, CA (US)

(73) Assignee: FLIGHT WORKS, INC., Irvine, CA (US)

( * ) Notice: Subject to any disclaimer, the term of this patent is extended or adjusted under 35 U.S.C. 154(b) by 58 days.

(21) Appl. No.: 18/319,122

(22) Filed: May 17, 2023

(51) Int. Cl.
*G05D 7/06* (2006.01)
*F04B 23/02* (2006.01)
*F04B 49/06* (2006.01)
*F04B 49/20* (2006.01)
*F04B 49/22* (2006.01)
*F15B 1/04* (2006.01)

(52) U.S. Cl.
CPC ............ *G05D 7/0676* (2013.01); *F04B 23/02* (2013.01); *F04B 49/065* (2013.01); *F04B 49/20* (2013.01); *F04B 49/22* (2013.01); *F15B 1/04* (2013.01)

(58) Field of Classification Search
CPC ........ F04B 23/02; F04B 49/065; F04B 49/20; F04B 49/22; F15B 1/04; F15B 1/024; F15B 21/005; F15B 21/14; F15B 2211/20515; F15B 2211/20561; F15B 2211/20569; F15B 2211/57; G05D 7/0676; Y10T 137/7869; Y10T 137/7871; Y10T 137/7873

USPC ............... 417/297, 301; 137/517, 519, 519.5
See application file for complete search history.

(56) References Cited

U.S. PATENT DOCUMENTS

| | | | | |
|---|---|---|---|---|
| 2,801,067 A * | 7/1957 | Mercier | ................ | F16K 15/148 92/92 |
| 3,496,879 A * | 2/1970 | Brandes | ................ | F04B 41/02 417/46 |
| 3,766,940 A * | 10/1973 | Mason | .................... | F16K 17/24 137/460 |
| 5,056,036 A * | 10/1991 | Van Bork | ............. | G05D 7/005 700/282 |
| 5,281,774 A * | 1/1994 | Masaki | .................... | B66B 1/24 187/253 |
| 8,523,533 B1 * | 9/2013 | Best | ........................ | F04B 1/32 417/904 |
| 2011/0079140 A1 * | 4/2011 | Baseley | .................... | F15B 1/26 92/90 |
| 2017/0138142 A1 * | 5/2017 | Leach | .................... | F04B 23/06 |

* cited by examiner

*Primary Examiner* — Essama Omgba
*Assistant Examiner* — Joseph S. Herrmann (57) ABSTRACT

Provided herein are various enhanced systems, apparatuses, and techniques for fluid displacement along a fluid link using a pump. One example includes an assembly including a pump and a normally-open valve coupled along a fluid link between a reservoir and an accumulator. The pump can move fluid from the reservoir to the accumulator to pressurize the accumulator or from the accumulator to the reservoir to drain the accumulator. After filling the accumulator with fluid, the pump can close the valve by establishing a reverse pressure differential across the valve. To refill or drain the accumulator, the pump can open the valve by establishing a forward pressure differential across the valve, then moving fluid in a reverse flow direction at a specified flow rate below a flow rate threshold.

20 Claims, 5 Drawing Sheets

NORMALLY-OPEN VALVE ASSEMBLY WITH VARIABLE SPEED FLUID DISPLACEMENT

TECHNICAL BACKGROUND

Hydraulic pump systems are employed across a wide range of application areas, such as medical devices, manufacturing and production systems, and aircraft and spacecraft re-fueling, among many other applications. In fluid displacement contexts, hydraulic pumps can move fluid from a reservoir vessel to an accumulator vessel by transferring mechanical energy (i.e., from a motor) into hydraulic energy. The accumulator vessel can build up pressure as it is filled up with fluid. In some examples, the accumulator vessel can pressurize a gas as liquid fills the accumulator vessel. In other cases, the accumulator vessel itself can become stretched or have walls under tension as liquid fills the accumulator vessel.

The pressure in an accumulator vessel can be maintained by using a combination of normally-closed check valves and other pressure control devices. Then, depressurization of a pressurized accumulator vessel after filling with fluid is often accomplished using an electrically-controlled valve, such as ball valve or butterfly valve, in addition to multiple other valves used previously for filling the accumulator vessel. This can lead to increased complexity, size, and mass of the system. For example, the addition of an electrically-controlled valve requires further controller functionality to ensure proper depressurization of the accumulator vessel and introduces additional force on the poppets of various valves in the system to fill and drain the accumulator vessel.

SUMMARY

The examples discussed herein include improved techniques, systems, and apparatuses that provide for controlled pressurization and depressurization of hydraulic accumulators. A pump can displace fluid through a fluid link in a forward flow direction to fill an accumulator vessel or in a reverse flow direction to drain the accumulator vessel. While operating in the forward flow direction, the pump can move fluid from a fluid reservoir to an accumulator vessel through a valve coupled along the fluid link. The valve can have a normally-open configuration. Accordingly, the fluid can travel through the valve towards the accumulator vessel at a wide range of flow rates while the valve is in an open state. As the accumulator vessel fills with fluid, pressure in the accumulator vessel can increase, and the pump establishes this increase in pressure. Once filled and/or pressurized, the accumulator vessel can be used in various hydraulic applications, including static and dynamic pressure-driven systems. While operating in the reverse flow direction, the pump first establishes a forward pressure differential across the normally-open valve to open, and then can drain fluid from the accumulator vessel to the reservoir through the normally-open valve to release pressure in the accumulator vessel. However, the pump may reduce the flow rate of the fluid in the reverse flow direction, such that the fluid can flow through the normally-open valve without creating too large of a reverse pressure differential across the valve sufficient to close the normally-open valve.

One example includes an assembly including a pump and a normally-open valve coupled along a fluid link between a reservoir and an accumulator vessel. The pump is capable of moving fluid in a forward direction flow from the reservoir to the accumulator vessel or in a reverse direction flow from the accumulator vessel to the reservoir through the normally-open valve in an open state. The pump is configured to establish a reverse pressure differential across the normally-open valve to produce a closed state of the normally-open valve. The pump is further configured to establish a forward pressure differential across the normally-open valve in the closed state to produce an open state of the normally-open valve and maintain the open state by at least moving the fluid in a reverse flow direction with a flow rate below a flow rate threshold.

Another example implementation includes a method of displacing fluid in a fluid link. The method includes establishing a reverse pressure differential across a normally-open valve coupled along a fluid link between a reservoir and an accumulator to produce a closed state of the normally-open valve after moving fluid in a forward flow direction from the reservoir to the accumulator vessel through the normally-open valve in an open state. The method also includes establishing a forward pressure differential across the normally-open valve in the closed state to produce the open state of the normally-open valve and moving the fluid through the fluid link in a reverse flow direction from the accumulator vessel to the reservoir through the normally-open valve in the open state to drain the fluid from the accumulator vessel. In the reverse flow direction, the fluid is moved with a flow rate below a flow rate threshold to maintain the open state of the normally-open valve while draining the accumulator vessel.

In yet another example, a pump controller is provided. The pump controller includes one or more computer-readable storage media and program instructions stored on the one or more computer-readable storage media that, based on being read and executed by a processing system, direct the pump controller to perform various functions. For example, the program instructions direct the pump controller to control a pump to establish a reverse pressure differential across a normally-open valve coupled along a fluid link between a reservoir and an accumulator to produce a closed state of the normally-open valve after moving fluid in a forward flow direction from the reservoir to the accumulator vessel through the normally-open valve in an open state. The program instructions also direct the pump controller to control the pump to establish a forward pressure differential across the normally-open valve in the closed state to produce the open state of the normally-open valve and control the pump to move the fluid through the fluid link in a reverse flow direction from the accumulator vessel to the reservoir through the normally-open valve in the open state to drain the fluid from the accumulator vessel. The pump can be controlled to move the fluid in the reverse flow direction with a flow rate below a flow rate threshold to maintain the open state of the normally-open valve.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Discussed herein are several enhanced techniques, systems, and apparatuses related to fluid displacement between pressurized reservoirs and controlled pressurization and depressurization of hydraulic accumulators. Hydraulic filling, holding, and draining of accumulators can serve various purposes. For example, an accumulator (e.g., an elastomeric bladder) can be filled to create a rigid, firm structure for use as a medical prosthesis, device, or implant. In another example, an accumulator can be filled with liquid and drained in a controlled or metered fashion. In a hydraulic pump system, such as disclosed herein, a pump (e.g., a variable-speed pump, variable flow-rate pump, or a bidirectional pump) and a normally-open valve can be employed to perform filling, holding, and draining operations. The pump can create a forward flow direction to fill an accumulator with fluid from a reservoir or a reverse flow direction to drain the fluid to the reservoir from the accumulator. The normally-open valve can be coupled along the fluid link between the reservoir and the accumulator and allow or restrict fluid flow based on a state of the valve. When the valve is in an open state, the pump can move fluid from the reservoir to the accumulator using the forward flow direction. After filling the accumulator, the valve can enter a closed state which is maintained closed by pressure in the accumulator to retain fluid in the accumulator despite an attempt to move fluid using the reverse flow direction. The pump can employ a pressure differential technique to open the valve, then use the reverse flow direction to drain the accumulator when necessary.

The pump can operate various sequences to fill, hold, and drain the accumulator. Such sequences can direct the pump to use the forward flow direction or the reverse flow direction at one or more different flow rates. The sequences can be determined by an electronic controller and provided to control operations of the pump. For example, a first sequence may include using the forward flow direction at a first flow rate to fill the accumulator. A second sequence may include using the reverse flow direction at a second flow rate to drain the accumulator. In some cases, the second flow rate may be below a threshold flow rate to avoid closing the valve when draining the accumulator. Various combinations of flow rates and directions can be used to perform filling, holding, and draining operations.

Figure 1:
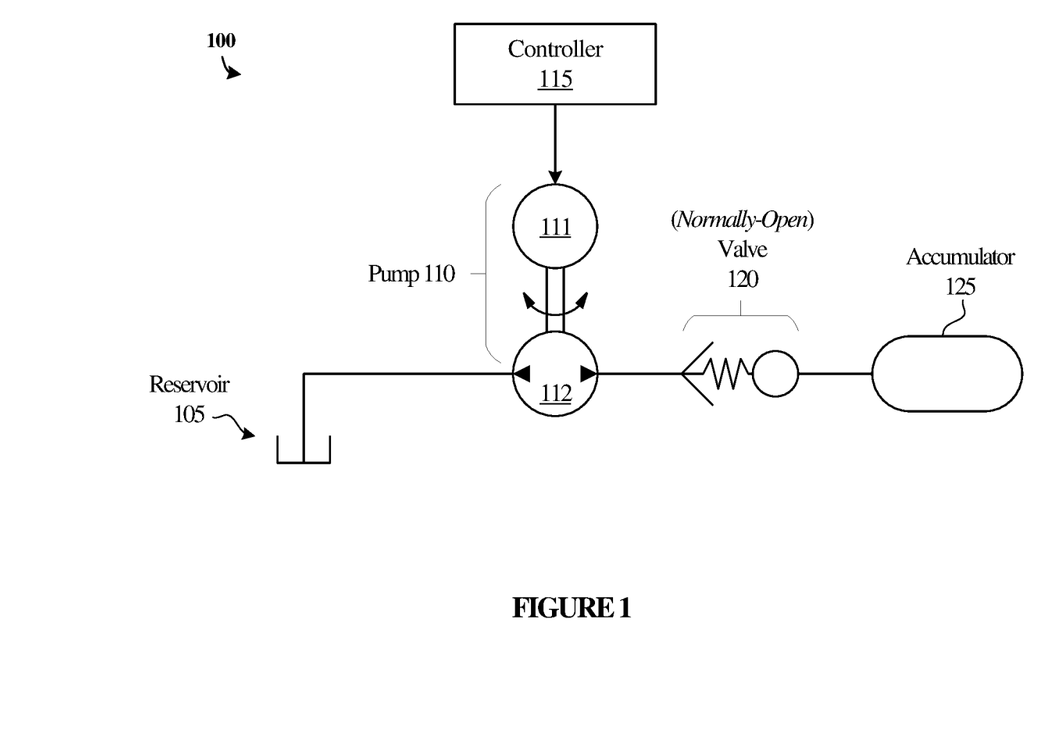
FIG. 1 illustrates an example operating environment demonstrating fluid displacement among components of a fluid link in an implementation.

Turning now to the Figures, FIG. 1 shows operating environment 100, which demonstrates a fluid link between a reservoir and an accumulator, and a pump-valve assembly coupled thereto capable of moving fluid between components of the fluid link. Operating environment 100 includes fluid reservoir 105, pump 110, controller 115, valve 120, and accumulator 125. Controller 115 is operatively coupled to pump 110 and may direct pump 110 to operate fluid displacement processes, such as those discussed herein.

In operating environment 100, fluid reservoir 105 and accumulator 125 are coupled together to form a fluid link for transferring fluid between each other. Fluid reservoir 105 is representative of a fluid storage device, such as a container, a tank, a bladder, or a chamber, among other reservoirs. Accumulator 125 is representative of an accumulator vessel downstream in the fluid link relative to fluid reservoir 105 capable of receiving and storing fluid from fluid reservoir 105. Accumulator 125 can be filled to establish pressure for various uses and drained to release pressure and provide fluid back to fluid reservoir 105, which is often unpressurized. As accumulator 125 receives fluid, a corresponding pressure can increase based on the amount of the fluid in accumulator 125. For example, accumulator 125 may be a gas-charged accumulator that pressurizes accompanying gas as liquid enters accumulator 125. In another example, accumulator 125 may be an elastomeric accumulator that stores pressure energy in a flexible material as liquid enters accumulator 125. By way of another example, accumulator 125 may be a spring-loaded accumulator that builds mechanical pressure by way of compression of a spring-loaded piston as liquid enters accumulator 125.

Pump 110 and valve 120 form an assembly coupled along the fluid link between fluid reservoir 105 and accumulator 125 to allow or prevent fluid flow between fluid reservoir 105 and accumulator 125. Pump 110 is representative of a variable-speed pump, variable flow-rate pump, a bidirectional pump, or any other type of pump capable of producing a forward flow direction and a reverse flow direction at varying flow rates when active. Pump 110 can move fluid from fluid reservoir 105 to accumulator 125 through valve 120 by using a forward flow direction. Pump can move fluid from accumulator 125 to fluid reservoir 105 through valve 120 by using a reverse flow direction.

Valve 120 is representative of a valve designed to remain open under ambient conditions and only close responsive to a 'closing' pressure differential applied thereto, and thus, comprises a normally-open valve configuration. In various examples, valve 120 includes a spring and a poppet coupled to a distal end of the spring. In the normally-open configuration, the spring may be extended (i.e., not compressed), such that the poppet does not block an opening (e.g., an aperture) of valve 120. In this open state, fluid can flow in either direction through the opening of valve 120 without obstruction. Valve 120 may remain in the open state until a closing, or reverse, pressure differential is established across valve 120, greater than the opposing pressure of the spring relative to the pressure differential, which causes the spring to depress.

The closing pressure differential may be created by head loss over valve 120 within the moving fluid. For example, the spring and the apertures/channels of valve 120 can reduce the pressure in the fluid coming from accumulator 125 as the fluid travels through valve 120 in the reverse flow direction. Thus, the design of valve 120, such as the spring strength and the diameter of the apertures/channels of valve 120, may influence the pressure differential established across valve 120 under various flow rates. As such, valve 120 may be designed to open and close under various pressure differentials established across valve 120. When a reverse pressure differential is established that causes the spring to depress, valve 120 can change to a closed state in which the poppet obstructs fluid flow through the opening of valve 120. In some examples, the poppet may be a plate with a gasket (e.g., an O-ring) that can seal the opening of valve 120 when valve 120 is in the closed state. However, other means to seal the opening of valve 120 can be employed. Valve 120 may then remain in the closed state due to static pressure established in accumulator 125 after accumulator 125 is filled with fluid.

To move fluid bidirectionally in the fluid link and create pressure differentials to change states of valve 120, pump 110 may include motor 111 capable of generating energy to operate pump element 112 and displace the fluid at varying flow rates and in different directions in the fluid link. Motor 111 of pump 110 can operate based on commands from controller 115 coupled to pump 110. Controller 115 may be configured to execute fluid displacement sequences for filling, holding, and draining accumulator 125. Each fluid displacement sequence may indicate a direction of fluid flow, a flow rate, and a duration. Accordingly, motor 111 may be driven at variable speeds or driven to produce variable flow rates in a forward or reverse mode for an amount of time based on the commands provided by controller 115. In some examples, a speed of pump 110 (in revolutions per minute or RPM) is proportional to a flow rate established by pump 110 (except after valve 120 is closed). Motor 111 can comprise a motor of various types which support bidirectional operation, or may include a motor capable of only unidirectional operation with various gearing or transmission elements positioned between motor 111 and pump element 112. In one example, motor 111 comprises an electric motor capable of bidirectional function. Pump element 112 can comprise a pumping component of various types which can support fluid displacement based on operations of motor 111. For example, pump element 112 may comprise one or more vanes, impellers, gears, or pistons, among other pump elements.

In operation, controller 115 can first direct pump 110 to operate according to a filling sequence. The filling sequence may include an instruction for motor 111 of pump 110 to establish the forward flow direction at a flow rate to move fluid from fluid reservoir 105 to accumulator 125. In some cases, the duration for which motor 111 can be directed to fill accumulator 125 may be determined based on the capacity of accumulator 125 and the first flow rate. Thus, motor 111 can produce the forward flow direction for an amount of time until accumulator 125 is full or reaches a desired capacity. In other cases, the duration may be determined based on pressure sensor information captured at accumulator 125.

Next, controller 115 can direct pump 110 to operate according to a holding sequence. The holding sequence may include an instruction for motor 111 of pump 110 to establish a reverse pressure differential across valve 120 to close valve 120 and hold fluid in accumulator 125. Motor 111 can create the reverse pressure differential by establishing a reverse flow pulse using the reverse flow direction. The reverse flow pulse may include a short duration burst of fluid flow in the reverse flow direction. The flow rate at which motor 111 establishes the reverse flow pulse may be a flow rate capable of creating a reverse pressure differential across valve 120 greater than the pressure of the spring holding normally-open valve 120 in the open state. In other examples, the reverse pressure differential is established at least in part by the accumulated pressure held by accumulator 125. After performing the holding sequence, pump 110 may become inactive for a duration. Valve 120 may remain in the closed state when pump 110 is inactive due to static pressure established in accumulator 125. Pump 110 may remain inactive until controller 115 directs pump 110 to perform a further filling sequence. Alternatively, pump 110 may remain inactive until controller 115 directs pump 110 to perform a draining sequence.

Controller 115 can direct pump 110 to operate according to a draining sequence with respect to accumulator 125. The draining sequence may include a first instruction for motor 111 to establish a forward pressure differential across valve 120 to open valve 120. Motor 111 can create the forward pressure differential by establishing a forward flow pulse using the forward flow direction. The forward flow pulse may include a short duration burst of fluid flow in the forward flow direction at a flow rate capable of creating a pressure differential across valve 120 greater than the static pressure of accumulator 125 holding valve 120 closed. Once valve 120 is in the open state, controller 115 can provide a second instruction for motor 111 to establish the reverse flow direction at a specified flow rate to drain fluid from accumulator 125 to fluid reservoir 105 through valve 120, while valve 120 remains in the open state. Controller 115 can direct motor 111 to use a flow rate below a threshold flow rate to maintain the open state of valve 120. The threshold flow rate may be determined based on the spring pressure of valve 120, as well as the head loss across valve 120. In other words, controller 115 may direct motor 111 to use a flow rate in the reverse flow direction that creates a reverse pressure differential across valve 120 less than the pressure of the spring holding valve 120 in the open state so that valve 120 does not close during the draining sequence.

In various examples, the components of operating environment 100 can be used in medical applications. For instance, accumulator 125 may be an elastomeric bladder that can be filled, as described above, to form a semi-rigid structure for use in the human body, such as for use in penile implants for erectile dysfunction therapies. Advantageously, the assembly illustrated in FIG. 1 can perform hydraulic filling, holding, and draining operations with a small quantity of electronic and mechanical elements, along with a single normally-open valve to provide a small, minimally invasive solution for pressurization of a bladder accumulator.

In other examples, the components of operating environment 100 can be used in micro-dosing applications. For instance, accumulator 125 can be filled to reach variable pressures, and accumulator 125 can also be depressurized at selectable, controlled, or metered rates. Accordingly, pump 110 can perform fluid displacement sequences to provide for a metered or controlled release of fluid from accumulator 125 to another device, container, and/or surface (not shown) taking into consideration a single valve without additional vent valves.

In further examples, the components of operating environment 100 can be used in vehicle, aircraft, and spacecraft refueling applications. For instance, fluid reservoir 105 and accumulator 125 can be closed, pressurized reservoirs coupled together to form a sealed fluid link. Fluid reservoir 105 may be a fuel basin, and accumulator 125 may be a fuel tank inside a plane or spacecraft. In operation, pump 110 can transfer fuel from the fuel basin to the vehicle using the fluid link without risk of external contamination or pressure.

Figure 2:
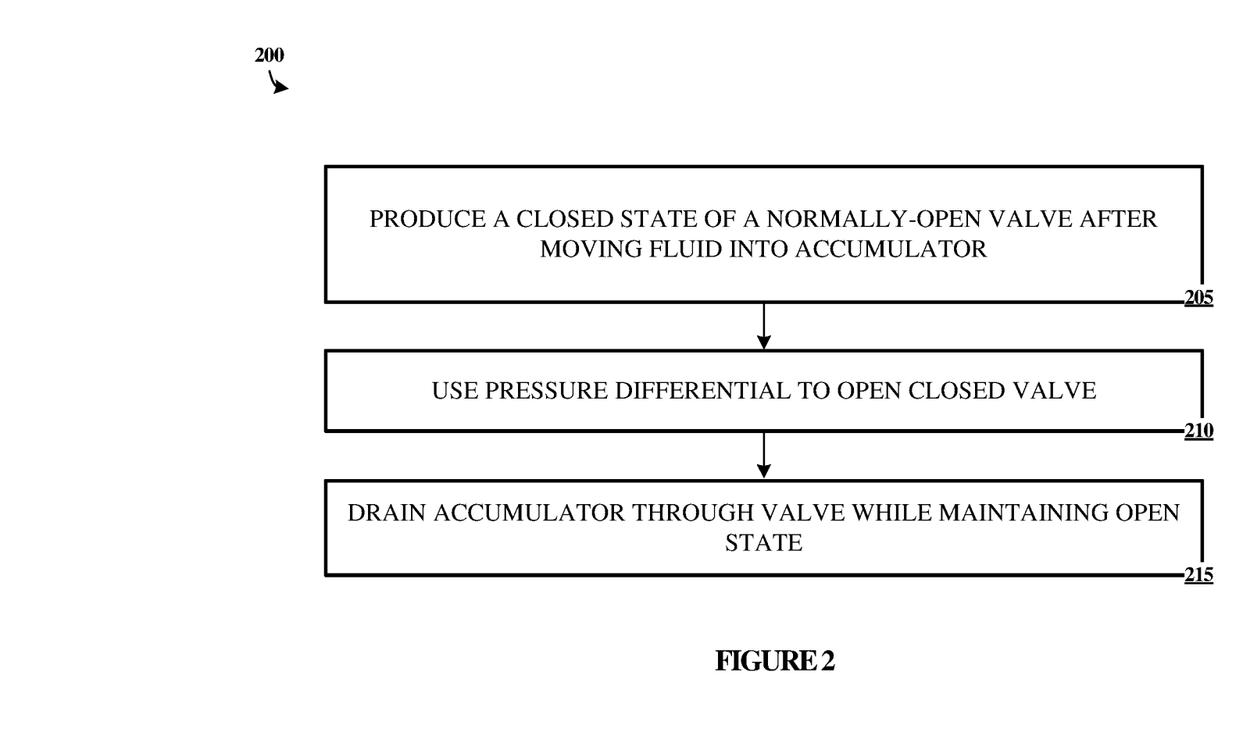
FIG. 2 illustrates a series of operations for bidirectional fluid displacement through a fluid link between a reservoir and an accumulator in an implementation.

FIG. 2 illustrates a series of operations for bidirectional fluid displacement through a fluid link between a reservoir and an accumulator in an implementation. FIG. 2 includes process 200, operations of which are noted parenthetically in the discussion below and reference elements of FIG. 1. Process 200 may be performed by one or more processors or a controller, such as controller 115 of FIG. 1. For example, process 200 can be implemented in software, firmware, and/or hardware, or any combination or variation thereof.

In operation 205, controller 115 controls pump 110 to produce (205) a closed state of valve 120 after moving fluid through a fluid link from fluid reservoir 105 into accumulator 125. Pump 110 is coupled along the fluid link between fluid reservoir 105 and valve 120 and is configured to move the fluid in the forward flow direction or in a reverse flow direction at varying flow rates based on instructions of controller 115. When producing the forward flow direction, pump 110 can fill accumulator 125 with fluid from fluid reservoir 105. However, once accumulator 125 is filled with a desired amount of fluid or to a desired pressure, pump 110 may be controlled to turn off and close valve 120 to maintain the pressure of accumulator 125.

Valve 120 is representative of a valve designed to remain open under ambient conditions and only close responsive to a 'closing' pressure differential applied thereto, and thus, comprises a normally-open valve configuration. In various examples, valve 120 includes a spring and a poppet coupled to a distal end of the spring. In the normally-open configuration, the spring may be extended, such that the poppet does not block an opening of valve 120, to allow fluid to flow through the opening of valve 120.

After filling accumulator 125, pump 110 can produce the closed state of valve 120 by establishing a closing, or reverse, pressure differential across valve 120. In those closed state, the spring of valve 120 may be depressed, and the poppet can seal the opening of valve 120 preventing fluid flow through valve 120. The closing pressure differential may be created by head loss over valve 120 within the moving fluid. To create the head loss for closing valve 120, controller 115 can control pump 110 to establish a reverse flow pulse using the reverse flow direction. The reverse flow pulse may include a short duration burst of fluid flow in the reverse flow direction. The flow rate at which pump 110 establishes the reverse flow pulse may be a flow rate capable of creating a reverse pressure differential across valve 120 greater than the pressure of the spring holding valve 120 in the open state. In other examples, the reverse pressure differential is established, at least in part, by the accumulated pressure held by accumulator 125. Once valve 120 is in the closed state, static pressure established in accumulator 125 can maintain the closed state of valve 120.

In operation 210, controller 115 can control pump 110 to use (210) a forward pressure differential across valve 120 in the closed state to open valve 120. To create the forward pressure differential, pump 110 can establish a forward flow pulse using the forward flow direction. The forward flow pulse may include a short duration burst of fluid flow in the forward flow direction at a flow rate capable of creating a pressure differential across valve 120 greater than the static pressure of accumulator 125 holding valve 120 closed.

Lastly, in operation 215, controller 115 controls pump 110 to drain (215) accumulator 125 through valve 120 while maintaining the open state of valve 120. To maintain the open state of valve 120, controller 115 can control pump 110 to establish the reverse flow direction at a specified flow rate below a threshold flow rate to maintain the open state of valve 120 while fluid flows through valve 120 in the open state. The threshold flow rate may be determined based on the spring pressure of valve 120, as well as the head loss across valve 120. In other words, controller 115 may direct pump 110 to use a flow rate in the reverse flow direction that creates a reverse pressure differential across valve 120 less than the pressure of the spring holding valve 120 in the open state so that valve 120 does not close during the draining sequence.

Figure 3:
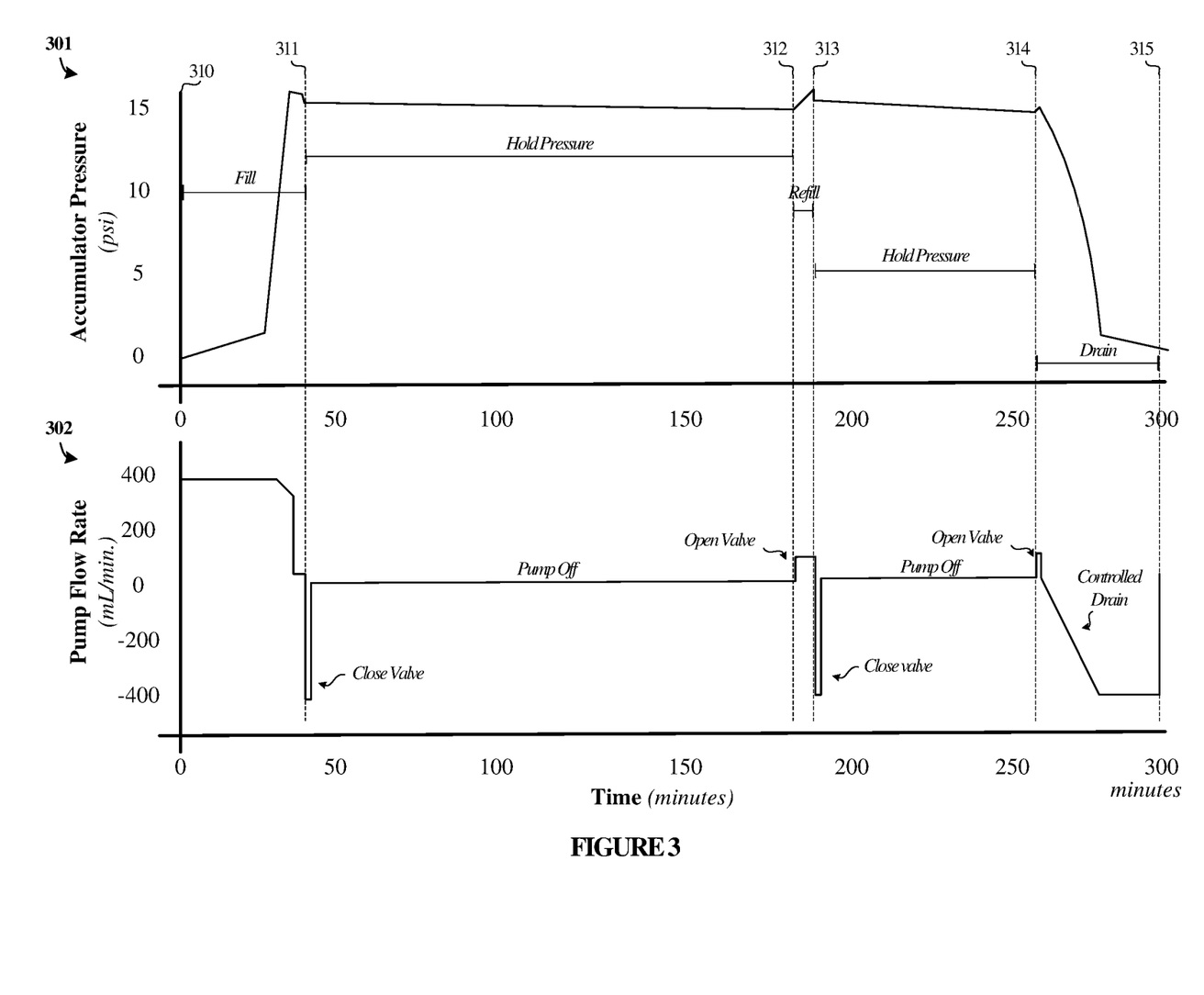
FIG. 3 illustrates graphical representations of filling, holding, and draining components of a fluid link in an implementation.

FIG. 3 illustrates graphical representations of filling, holding, and draining of an accumulator in a fluid link between a fluid reservoir and the accumulator in an implementation. FIG. 3 includes graphical representation 301, which shows pressure changes of an accumulator over time. FIG. 3 also includes graphical representation 302, which shows the flow rate and direction at which a pump operates over time while filling, holding, and draining the accumulator. Graphical representations 301 and 302 may include example values captured during a fluid displacement process, such as process 200 of FIG. 2, performed by elements of a hydraulic pump assembly, such as pump 110 of FIG. 1. Accordingly, the discussion below references elements of FIG. 1 and operation thereof with respect to times 310, 311, 312, 313, 314, and 315. While graphical representations 301 and 302 show examples of fluid displacement sequences, any variation or combination of flow rates, pressures, durations, and the like can be used to fill, hold, and drain accumulators for various hydraulic and other uses.

At a first time, time 310, pump 110 may be turned on, via an instruction from controller 115 coupled to pump 110, to begin a filling sequence with respect to accumulator 125. During the filling sequence, controller 115 can control pump 110 to produce a forward flow direction at a flow rate of approximately 400 milliliters per minute (mL/min) for example, as illustrated in graphical representation 302. Pump 110 can produce the forward flow direction at this flow rate to move fluid along the fluid link from fluid reservoir 105 to accumulator 125 through valve 120 in an open state for a duration to pressurize accumulator 125 to a desired accumulator pressure, such as approximately 15 pounds per square inch (PSI) as illustrated in graphical representation 301.

As the corresponding pressure in accumulator 125 reaches the desired pressure near time 311, controller 115 can control pump 110 to operate according to a holding sequence to hold fluid in accumulator 125 and retain the pressurization of accumulator 125. The holding sequence may include an instruction for pump 110 to establish a reverse pressure differential across valve 120 to close valve 120 and hold accumulator 125 at a near-constant pressure. To create the reverse pressure differential, pump 110 can reduce the flow rate to 0 mL/min, then, at time 311, establish a reverse flow pulse using the reverse flow direction. As illustrated, the reverse flow pulse may include a short duration burst of fluid flow in the reverse flow direction at a flow rate of 400 mL/min. Shortly after time 311, pump 110 can turn off, or reduce the flow rate from 400 mL/min in the reverse flow direction to 0 mL/min. While a flow rate of −400 mL/min is shown to establish the reverse pressure differential, the flow rate at which pump 110 establishes the reverse flow pulse may be any flow rate capable of creating a reverse pressure differential across valve 120 greater than the pressure of a spring holding valve 120 in the open state. In some cases, the reverse pressure differential across valve 120 may be established, at least in part, by the accumulated pressure held by accumulator 125. Pump 110 can remain inactive from time 311 to time 312 to retain a pressure of approximately 15 PSI in accumulator 125. This static pressure established in accumulator 125 may maintain the closed state of valve 120 while pump 110 is inactive.

At time 312, controller 115 can control pump 110 to refill accumulator 125 with more fluid to re-pressurize accumulator 125 to the desired pressure. For example, the pressure of accumulator 125 may decrease over time due to hydraulic use, a leak, or for some other reason. Controller 115 can control pump 110 to establish the forward flow direction with a flow rate of approximately 100 mL/min for a short duration to open valve 120 and refill accumulator 125 with an amount of fluid from fluid reservoir 105 to pressurize accumulator 125 to the desired pressure. Any flow rate in the forward flow direction capable of producing a forward pressure differential across valve 120 greater than the opposing static pressure established in accumulator 125 to open valve 120 can be used.

Next, at time 313, controller 115 controls pump 110 to operate according to the holding sequence to hold fluid in accumulator 125, and consequently, pressurization of accumulator 125. Pump 110 can establish another reverse flow pulse by changing directions of the fluid flow and producing the reverse flow rate at a flow rate capable of establishing the reverse pressure differential across valve 120 to close valve 120 (e.g., 400 mL/min in the reverse flow direction). Then, pump 110 can turn off for a duration to hold pressure in accumulator 125 from time 313 to time 314.

At time 314, controller 115 can control pump 110 to operate according to a draining sequence. The draining sequence may include a first instruction for pump 110 to establish a forward pressure differential across valve 120 to open valve 120. To create the forward pressure differential, pump 110 can establish a forward flow pulse using the forward flow direction. The forward flow pulse may include a short duration burst of fluid flow in the forward flow direction at a flow rate capable of creating a pressure differential across valve 120 greater than the static pressure of accumulator 125 holding valve 120 closed. The flow rate of the forward flow pulse may be 100 mL/min, but any other flow rate capable of opening valve 120 may be used.

Once valve 120 is in the open state, controller 115 can provide a second instruction for pump 110 to establish the reverse flow direction at a flow rate to drain fluid from accumulator 125 to fluid reservoir 105 through valve 120 in the open state. During the draining sequence, controller 115 can direct pump 110 to use a specified flow rate below a threshold flow rate to maintain the open state of valve 120. The threshold flow rate may be determined based at least in part on the spring pressure of valve 120. The threshold flow rate may also be based on the head loss across valve 120. The threshold flow rate may further be based on the amount of pressure established in accumulator 125 at a given time as the pressure of accumulator 125 can create a reverse pressure differential across valve 120 in addition to the reverse pressure differential across valve 120 caused by fluid moving in reverse flow direction during the draining sequence. In other words, controller 115 may direct pump 110 to use a flow rate in the reverse flow direction that creates a reverse pressure differential across valve 120 less than the pressure of the spring holding valve 120 in the open state so that valve 120 does not close during the draining sequence due to either fluid flowing in the reverse flow direction and/or the pressure releasing from accumulator 125. In various examples, such as the example illustrated in graphical representation 301, pump 110 can drain accumulator 125 with a steadily increasing flow rate (in the reverse flow direction) over time to perform a controlled drain of accumulator 125. Pump 110 may increase the flow rate over time as pressure in accumulator 125 decreases over time.

Finally, at time 315, pressure in accumulator 125 can be reduced to 0 PSI, and pump 110 can be turned off or operate according to further filling and holding sequences, as necessary.

Figure 4:
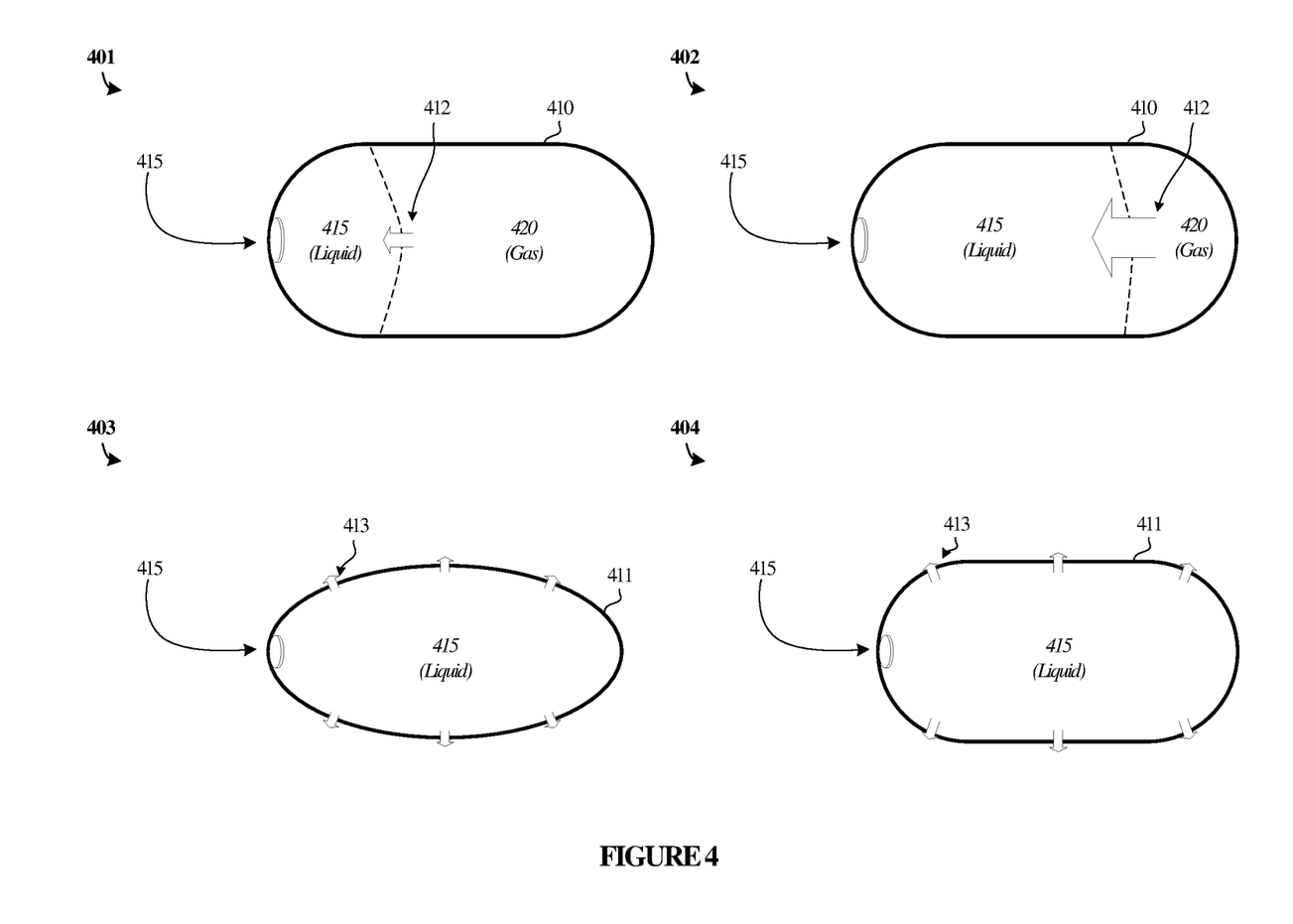
FIG. 4 illustrates example accumulator vessels that may be used in an implementation.

FIG. 4 illustrates example accumulator vessels that may be used in an implementation. FIG. 4 includes configurations 401, 402, 403, and 404. Configurations 401 and 402 show accumulator 410 at a first time and a second time, respectively. Configurations 403 and 404 show accumulator 411 at a first time and a second time, respectively. Accumulators 410 and 411 can be used in fluid displacement processes and techniques, such as process 200 of FIG. 2, and may represent an accumulator vessel used in a fluid link, such as accumulator 125 of FIG. 1.

Referring first to accumulator 410 of configurations 401 and 402, accumulator 410 is representative of a gas-charged accumulator capable of pressurizing accompanying internal gas as liquid 415 enters accumulator 410. The amount of internal gas pressure 412 may be proportional to an amount of liquid 415 present in accumulator 410. A pump coupled along a fluid link between accumulator 410 and a fluid reservoir (not shown) can move liquid 415 from the fluid reservoir to accumulator 410 as part of a hydraulic filling sequence. At a first time, as illustrated in configuration 401, the pump can provide an amount of liquid 415 to accumulator 410 such that accumulator 410 is approximately one-quarter liquid 415 and three-quarters gas 420. Gas 420 may be at a lower pressure in accumulator 420 compared to when accumulator 410 is full or nearly filled with liquid 415 in configuration 402. Accordingly, accumulator 410 can have a relatively small amount of internal gas pressure 412 in configuration 401.

At a second time, as illustrated in configuration 402, accumulator 410 contains approximately three-quarters liquid 415 and one-quarter gas 420. As the amount of liquid 415 increases, accumulator 410 compresses gas 420 and produces a larger pressure relative to configuration 401. Internal gas pressure 412 can be used for hydraulic applications and also exerts pressure to a normally-open valve coupled along the fluid link between the pump and accumulator 410 to close the valve and prevent liquid 415 from leaving accumulator 410 and flowing back through the fluid link to the fluid reservoir.

Referring next to accumulator 411 of configurations 403 and 404, accumulator 411 is representative of an elastomeric accumulator capable of establishing elastic pressure 413 caused by elastic strain or tension of a flexible material (e.g., rubber or spring) of accumulator 411 as liquid 415 fills accumulator 411. A pump coupled along a fluid link between accumulator 411 and a fluid reservoir (not shown) can provide liquid 415 from the fluid reservoir to accumulator 411 as part of a hydraulic filling sequence. At a first time, as illustrated in configuration 403, the pump provides an amount of liquid 415 to accumulator 411 such that accumulator 411 is not fully expanded. In other words, accumulator 411 may not yet have stored pressure energy in the material of accumulator 411 to form a more rigid or firm arrangement of accumulator 411.

Configuration 404 illustrates a second time when the pump has filled accumulator 411 with more liquid 415. At this time, accumulator 411 may be filled to capacity with liquid 415. When filled with this amount of liquid 415, the flexible material of accumulator 415 can expand fully and form a more rigid structure. The flexible material can store a larger amount of elastic pressure 413 relative to elastic pressure 413 at the first time. It follows that as more liquid 415 enters inside accumulator 411, more elastic pressure 413 is produced by accumulator 411. When pressurized with elastic pressure 413, accumulator 411 may be used in hydraulic applications and medical applications. Additionally, accumulator 411 can establish a pressure differential across a normally-open valve coupled along the fluid link to close the valve and prevent liquid 415 from leaving accumulator 411 and flowing back through the fluid link to the fluid reservoir.

Figure 5:
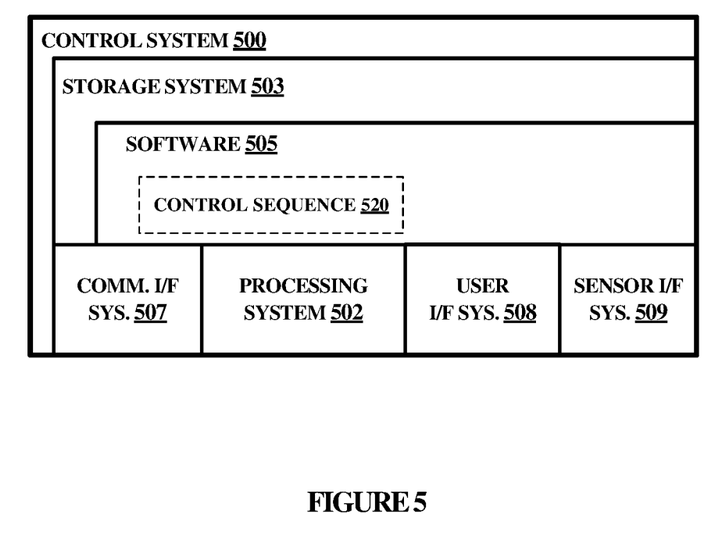
FIG. 5 illustrates a control system that may be used in an implementation.

FIG. 5 illustrates control system 500 and associated software 505 in an implementation. FIG. 5 illustrates control system 500 that is representative of any system or collection of systems in which the various operational architectures, scenarios, and processes disclosed herein may be implemented. For example, control system 500 can be used to implement and operate controller 115 of operating environment 100 of FIG. 1.

Control system 500 may be implemented as a single apparatus, system, or device or may be implemented in a distributed manner as multiple apparatuses, systems, or devices. Control system 500 includes, but is not limited to, processing system 502, storage system 503, software 505, communication interface system 507, user interface system 508, and sensor interface system 509. Processing system 502 is operatively coupled with storage system 503, communication interface system 507, user interface system 508, and sensor interface system 509.

Processing system 502 loads and executes software 505 from storage system 503. Software 505 includes control sequence 520, which is representative of the processes and techniques discussed with respect to the included Figures. When executed by processing system 502 to control fluid flow in a fluid link, software 505 directs processing system 502 to operate as described herein for at least the various processes, operational scenarios, and sequences discussed in the foregoing implementations. Control system 500 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions comprising control sequence 520 that provide control of a pump, among other elements. In particular, the program instructions may include various components or modules that cooperate or otherwise interact to carry out the various processes and operational scenarios described herein. The various components or modules may be implemented in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include control sequence 520. Software 505 may also comprise firmware or some other form of machine-readable processing instructions executable by processing system 502.

Software 505, when loaded into processing system 502 and executed, may transform a suitable apparatus, system, or device (of which control system 500 is representative) overall from a general-purpose computing system into a special-purpose computing system customized to provide control of fluid flow in a fluid link between a reservoir and an accumulator. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors. For example, if the computer-readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems or electrical components (not shown) over communication links or communication networks (not shown). Examples of connections and devices that together allow for inter-system communication may include transceivers, network interface controllers, antennas, power amplifiers, RF circuitry, and other communication circuitry. The connections and devices may communicate over communication media to exchange communications with other computing systems or networks of systems, such as metal, glass, air, or any other suitable communication media. Physical or logical elements of communication interface system 507 can provide control of a pump, such as pump flow rate control, pump speed control, and pump direction control, among other functions.

Communication interface system 507 may include portions of sensor system interface 509. Sensor system interface 509 comprises various hardware and software elements for interfacing with pump and motor instrumentation, pump sensors, motor sensors, accumulator sensors, valve sensors, or other devices. For example, sensor system interface 509 can receive or obtain pump flow rate data, pump speed data, accumulator pressure data, or other data. Data processing elements or other equipment can be included in sensor system interface 509.

User interface system 508 may include one or more interfaces to configure control aspects of control system 500. User interface system 508 may comprise API elements for interfacing with users, other data systems, other user devices, and the like. User interface system 508 may also include associated user interface software executable by processing system 502 in support of the various user input and output devices discussed above. Separately or in conjunction with each other and other hardware and software elements, the user interface software and user interface devices may support a console user interface, graphical user interface, a natural user interface, or any other type of user interface.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

The invention claimed is:

1. An assembly, comprising:
   a pump; and
   a valve having a normally-open configuration and coupled along a fluid link between a reservoir and an accumulator vessel;
   the pump configured to:
   establish a reverse pressure differential across the valve to produce a closed state of the valve after moving fluid in a forward flow direction from the reservoir to the accumulator vessel through the valve in an open state;
   establish a forward pressure differential across the valve in the closed state to produce an open state of the valve;
   moving the fluid through the fluid link in a reverse flow direction from the accumulator vessel to the reservoir through the valve in the open state to drain the accumulator; and
   maintain the open state by at least moving the fluid in the reverse flow direction with a flow rate below a flow rate threshold.

2. The assembly of claim 1, wherein when in the closed state of the valve, the closed state is maintained by a static pressure established in the accumulator vessel when the pump is an inactive state.

3. The assembly of claim 1, wherein the pump is configured to establish the reverse pressure differential across the valve by at least establishing a reverse flow pulse using the reverse flow direction.

4. The assembly of claim 1, wherein the pump is configured to establish the forward pressure differential across the valve by at least establishing a forward flow pulse using the forward flow direction.

5. The assembly of claim 1, wherein when in the open state of the valve, the open state is maintained by a static pressure established by a spring mechanism in the valve.

6. The assembly of claim 5, wherein the flow rate threshold is based at least on the static pressure established by the spring mechanism in the valve.

7. The assembly of claim 1, wherein the accumulator vessel is one among an elastomeric bladder, a gas-charged accumulator vessel, and a spring-loaded accumulator vessel.

8. A method, comprising:
   establishing a reverse pressure differential across a normally-open valve coupled along a fluid link between a reservoir and an accumulator to produce a closed state of the normally-open valve after moving fluid in a forward flow direction from the reservoir to the accumulator through the normally-open valve in an open state;
   establishing a forward pressure differential across the normally-open valve in the closed state to produce the open state of the normally-open valve; and
   moving the fluid through the fluid link in a reverse flow direction from the accumulator to the reservoir through the normally-open valve in the open state to drain the accumulator, wherein the fluid is moved in the reverse flow direction with a flow rate below a flow rate threshold to maintain the open state of the normally-open valve.

9. The method of claim 8, wherein the closed state of the normally-open valve is maintained by a static pressure established in the accumulator when filled with the fluid.

10. The method of claim 8, wherein establishing the reverse pressure differential across the normally-open valve comprises establishing a reverse flow pulse using the reverse flow direction.

11. The method of claim 8, wherein establishing the forward pressure differential across the normally-open valve comprises establishing a forward flow pulse using the forward flow direction.

12. The method of claim 8, wherein when in the open state of the normally-open valve, the open state is maintained by a static pressure established by a spring mechanism in the valve.

13. The method of claim 8, wherein the accumulator is one among an elastomeric bladder, a gas-charged accumulator vessel, and a spring-loaded accumulator vessel.

14. The method of claim 8, wherein establishing the reverse pressure differential is based on a condition, wherein the condition comprises reaching a desired static pressure established in the accumulator when filled with the fluid.

15. A pump controller, comprising:
one or more computer-readable storage media; and
program instructions stored on the one or more computer-readable storage media that, based on being read and executed by a processing system, direct the pump controller to:
control a pump to establish a reverse pressure differential across a normally-open valve coupled along a fluid link between a reservoir and an accumulator to produce a closed state of the normally-open valve after moving fluid in a forward flow direction from the reservoir to the accumulator through the normally-open valve in an open state;
control the pump to establish a forward pressure differential across the normally-open valve in the closed state to produce the open state of the normally-open valve; and
control the pump to move the fluid through the fluid link in a reverse flow direction from the accumulator to the reservoir through the normally-open valve in the open state to drain the accumulator, wherein the pump is controlled to move the fluid in the reverse flow direction with a flow rate below a flow rate threshold to maintain the open state of the normally-open valve.

16. The pump controller of claim 15, wherein when in the closed state of the valve, the closed state is maintained by a static pressure established in the accumulator when the pump is an inactive state.

17. The pump controller of claim 15, wherein the program instructions direct the pump controller to control the pump to establish the reverse pressure differential across the valve by at least controlling the pump to establish a reverse flow pulse using the reverse flow direction.

18. The pump controller of claim 15, wherein the program instructions direct the pump controller to control the pump to establish the forward pressure differential across the valve by at least controlling the pump to establish a forward flow pulse using the forward flow direction.

19. The pump controller of claim 15, wherein when in the open state of the valve, the open state is maintained by a static pressure established by a spring mechanism in the valve.

20. The pump controller of claim 15, wherein the accumulator is one among an elastomeric bladder, a gas-charged accumulator vessel, and a spring-loaded accumulator vessel.

* * * * *